(12) United States Patent
Milligan

(10) Patent No.: US 8,916,626 B2
(45) Date of Patent: Dec. 23, 2014

(54) DRAG REDUCING COPOLYMERS FOR COLD FLUID APPLICATIONS

(75) Inventor: Stuart N. Milligan, Ponca City, OK (US)

(73) Assignee: Lubrizol Specialty Products, Inc., Houston, TX (US)

( * ) Notice: Subject to any disclaimer, the term of this patent is extended or adjusted under 35 U.S.C. 154(b) by 1054 days.

(21) Appl. No.: 12/183,158

(22) Filed: Jul. 31, 2008

(65) Prior Publication Data

US 2010/0029843 A1 Feb. 4, 2010

(51) Int. Cl.
| | |
|---|---|
| *B05D 5/08* | (2006.01) |
| *C09K 3/00* | (2006.01) |
| *C08F 2/20* | (2006.01) |
| *F17D 1/16* | (2006.01) |
| *C10L 1/10* | (2006.01) |
| *C10L 1/195* | (2006.01) |
| *C10L 1/196* | (2006.01) |
| *C10L 1/12* | (2006.01) |
| *C10L 1/236* | (2006.01) |

(52) U.S. Cl.
CPC ... *C10L 1/10* (2013.01); *C08F 2/20* (2013.01); *F17D 1/16* (2013.01); *C10L 1/195* (2013.01); *C10L 1/1963* (2013.01); *C10L 1/125* (2013.01); *Y02E 60/34* (2013.01); *C10L 1/2364* (2013.01)
USPC .......... 523/175; 524/379; 524/386; 524/599; 524/607

(58) Field of Classification Search
USPC .................. 524/379, 386, 599, 607; 523/175
See application file for complete search history.

(56) References Cited

U.S. PATENT DOCUMENTS

| | | | |
|---|---|---|---|
| 3,758,406 | A | 9/1973 | Malone et al. |
| 6,596,832 | B2 | 7/2003 | Johnston et al. |
| 7,285,582 | B2 | 10/2007 | Harris et al. |
| 2006/0144595 | A1* | 7/2006 | Milligan et al. ........... 166/305.1 |
| 2008/0064785 | A1 | 3/2008 | Martin et al. |
| 2008/0149530 | A1 | 6/2008 | Milligan et al. |

FOREIGN PATENT DOCUMENTS

| | | |
|---|---|---|
| EP | 0882739 | 12/1998 |
| WO | 2009055112 A | 4/2009 |
| WO | 2009055114 A | 4/2009 |

* cited by examiner

*Primary Examiner* — Kriellion Sanders
(74) *Attorney, Agent, or Firm* — Michele M. Tyrpak

(57) ABSTRACT

Drag reducing compositions comprising polymer particles, where the polymer particles include copolymers comprising the residues of at least one methacrylate monomer and at least one comonomer having a polymerizable vinyl group, where the comonomer has no more than one pendant substituent per vinyl carbon. The drag reducing compositions can have improved dissolution rates in hydrocarbon-containing fluids. The drag reducing compositions can be added to a hydrocarbon-containing fluid to decrease the pressure drop associated with the turbulent flow of the hydrocarbon-containing fluid through a conduit.

17 Claims, 2 Drawing Sheets

DRAG REDUCING COPOLYMERS FOR COLD FLUID APPLICATIONS

BACKGROUND OF THE INVENTION

1. Field of the Invention

The present invention relates generally to drag reducing compositions comprising copolymers. More specifically, the present invention relates to drag reducing compositions having copolymers comprising the residues of at least one methacrylate monomer and at least one comonomer having no more than one pendant substituent per vinyl carbon.

2. Description of the Prior Art

When fluids are transported by a pipeline, a drop in fluid pressure typically occurs due to friction between the wall of the pipeline and the fluid. Due to this pressure drop, for a given pipeline, fluid must be transported with sufficient pressure to achieve a desired throughput. When higher flow rates are desired through the pipeline, more pressure must be applied due to the fact that as flow rates are increased the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million. However, many conventional drag reducers do not perform well in colder temperature fluids, which may be due to lower dissolution rates caused by lower temperatures.

SUMMARY OF THE INVENTION

In one embodiment of the present invention, there is provided a drag reducing composition comprising: a continuous phase and a plurality of drag reducing polymer particles. At least a portion of the polymer particles comprise copolymers containing the residues of at least one methacrylate monomer and the residues of at least one comonomer, and the comonomer comprises a polymerizable vinyl group having no more than one pendant substituent per vinyl carbon.

In another embodiment of the present invention, there is provided a method of making a drag reducer. The method of this embodiment comprises: (a) combining water, at least one surfactant, at least one methacrylate monomer, and at least one comonomer to thereby form a reaction mixture; and (b) subjecting the reaction mixture to emulsion polymerization or suspension polymerization to thereby form a latex comprising a continuous phase and a plurality of drag reducing copolymer particles comprising residues of the methacrylate monomer and residues of the comonomer, where the comonomer comprises a polymerizable vinyl group having no more than one pendant substituent per vinyl carbon.

In yet another embodiment of the present invention, there is provided a method for reducing the pressure drop associated with the turbulent flow of a hydrocarbon-containing fluid through a pipeline. The method of this embodiment comprises: (a) introducing a drag reducing composition into the hydrocarbon-containing fluid, where the drag reducing composition is in the form of a latex or suspension comprising a continuous phase and a plurality of drag reducing polymer particles comprising copolymers containing the residues of at least one methacrylate monomer and the residues of at least one comonomer, where the comonomer comprises a polymerizable vinyl group having no more than one pendant substituent per vinyl carbon; and (b) flowing the resulting treated hydrocarbon-containing fluid through said pipeline. The hydrocarbon-containing fluid of this embodiment has an average temperature of 25° C. or less.

BRIEF DESCRIPTION OF THE DRAWING FIGURES

A preferred embodiment of the present invention is described in detail below with reference to the attached drawing figures, wherein.

DETAILED DESCRIPTION

Figure 1:
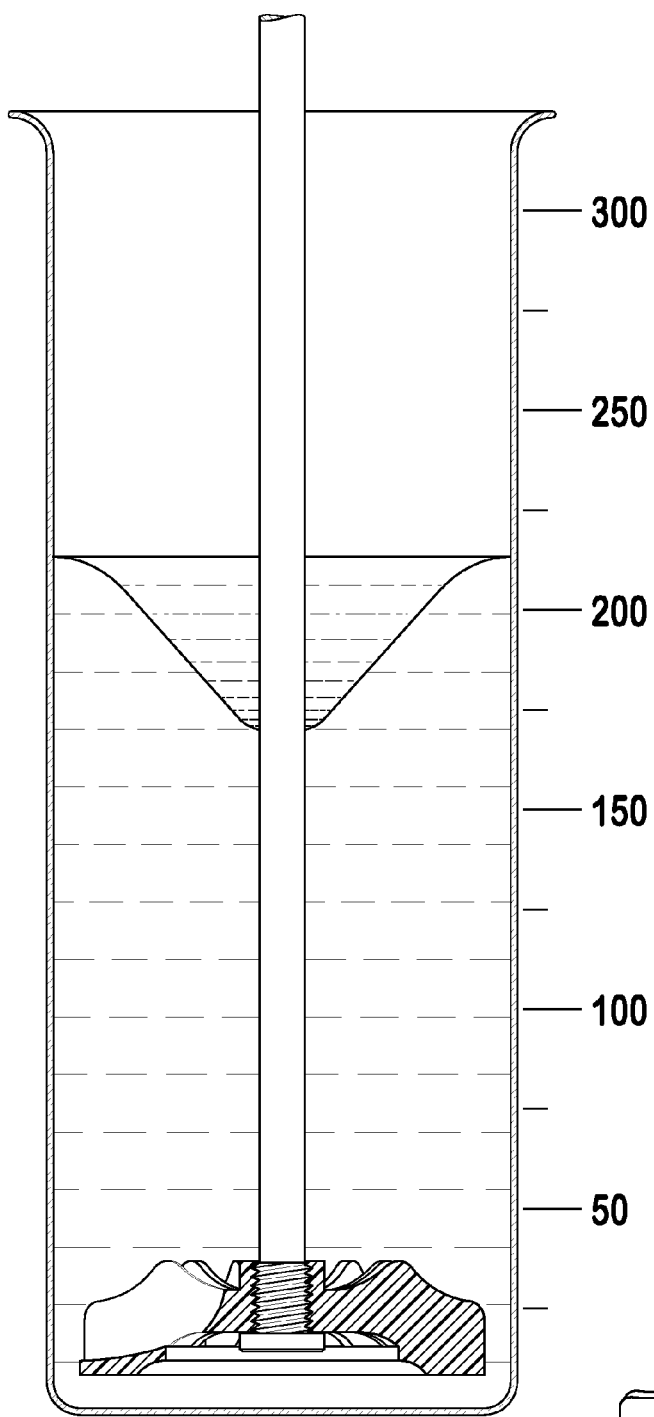
FIG. 1 is a schematic illustration of a test apparatus used to perform dissolution rate tests on various drag reducers.

In accordance with one embodiment of the present invention, a drag reducing composition (i.e., a drag reducer) is provided comprising a plurality of drag reducing polymer particles comprising copolymers containing the residues of at least two different monomers. The drag reducer of the present invention can be employed to at least partially reduce the pressure drop associated with the turbulent flow of a hydrocarbon-containing fluid through a conduit (e.g., a pipeline).

In one embodiment of the present invention, the above-mentioned drag reducing composition can comprise polymer particles containing copolymers formed via emulsion polymerization or suspension polymerization of a reaction mixture comprising at least two monomers, a continuous phase, at least one surfactant, and an initiation system. As used herein, the terms "emulsion polymer" and "emulsion drag reducing polymer" shall denote any polymer prepared via emulsion polymerization. As discussed in greater detail below, the resulting reaction product of the emulsion polymerization can be in the form of a latex drag reducer composition. As used herein, the terms "suspension polymer" and "suspension drag reducing polymer" shall denote any polymer prepared via suspension polymerization. As discussed below, the resulting reaction product of the suspension polymerization can be in the form of a suspension drag reducer composition.

The continuous phase of the drag reducer composition can generally comprise at least one component selected from the group consisting of water, one or more alcohols, one or more polyols, and mixtures thereof. When water is the selected constituent of the continuous phase, the reaction mixture can also comprise a buffer. Additionally, as described in more detail below, the continuous phase can optionally comprise a hydrate inhibitor. As described in more detail below, a stabilizer optionally can be added.

As mentioned above, the copolymer of the drag reducing compositions of the present invention can comprise the residues of at least two different monomers. In one embodiment, at least one of the monomers employed in producing the drag reducing composition can be a methacrylate monomer. Methacrylate monomers suitable for use in the present invention can have the following structure:

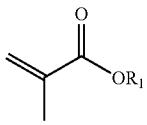

In one embodiment, $R_1$ of the above structure can comprise a $C_1$ to $C_{20}$ alkyl, isoalkyl, cycloalkyl, aryl, or aryl-substituted alkyl. In another embodiment, methacrylate monomers useful in the present invention can comprise $C_4$-$C_{20}$ alkyl, isoalkyl, cycloalkyl, $C_6$-$C_{20}$ substituted or unsubstituted aryl, or aryl-substituted $C_1$-$C_{10}$ alkyl esters of methacrylic acid. In still another embodiment, the methacrylate monomer employed in the present invention can comprise 2-ethylhexyl methacrylate.

The second monomer (a.k.a., comonomer) employed in making the drag reducing compositions of the present invention can comprise any monomer having a polymerizable vinyl group that has no more than one pendant substituent per vinyl carbon. As used herein, the term "polymerizable vinyl group" shall denote the carbon/carbon double bond of the monomer where polymerization of that monomer occurs. As used herein, the term "pendant substituent" shall denote any non-hydrogen atom or moiety covalently bonded to the vinyl carbon atom.

In one embodiment, the comonomer of the present invention can comprise one or more of the following structures:

a)

where $R_2$ can be —C(O)OR$_3$, phenyl or aryl, heterocyclic radical, such as, for example, a pyridinyl or pyridyl, —OR$_4$, or —O(O)CR$_5$; where $R_3$ can be a $C_1$ to $C_{20}$ alkyl, isoalkyl, cycloalkyl, aryl, or aryl-substituted alkyl; where $R_4$ can be a $C_1$ to $C_{20}$ alkyl, isoalkyl, cycloalkyl, aryl, or aryl-substituted alkyl; where $R_5$ can be a $C_1$ to $C_{20}$ alkyl, isoalkyl, cycloalkyl, aryl, or aryl-substituted alkyl; and/or

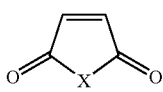

b)

where X can be O, or N—R$_6$, wherein R$_6$ is H, $C_1$ to $C_{20}$ alkyl, isoalkyl, cycloalkyl, aryl, aryl-substituted alkyl, or ring-opened alkyl diesters; and/or

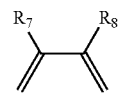

c)

where $R_7$ and $R_8$ can independently be H, $C_1$ to $C_{20}$ alkyl, isoalkyl, cycloalkyl, aryl, aryl-substituted alkyl, or heterocyclic radical.

In another embodiment, comonomers useful in the present invention can have the following structure:

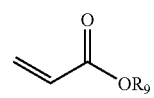

The $R_9$ moiety in the above structure can be a straight or branched aliphatic alkyl group having 8 or fewer carbon atoms, 6 or fewer carbon atoms, or 4 or fewer carbon atoms. Additionally, the comonomer can be selected from the group consisting of n-butyl acrylate; 2-ethylhexyl acrylate; 3,5,5-trimethylhexyl acrylate; tert-butyl acrylate; 2-phenylethyl acrylate; iso-butyl acrylate; isobornyl acrylate; n-hexyl acrylate; sec-butyl acrylate; ethyl acrylate; and lauryl acrylate. Furthermore, in one embodiment the comonomer can comprise n-butyl acrylate.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON® LSB from Rhodia Incorporated, Cranbury, N.J.), dioctyl sodium sulfosuccinate (available as AEROSOL® OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL® L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly(ethyleneoxy) ethanols (available as the IGEPAL® CA and CO series, respectively from Rhodia, Cranbury, N.J.), C8 to C18 ethoxylated primary alcohols (such as RHODASURF® LA-9 from Rhodia Inc., Cranbury, N.J.), C11 to C15 secondary-alcohol ethoxylates (available as the TERGITOL® 15-S series, including 15-S-7, 15-S-9, 15-S-12, from Dow Chemical Company, Midland, Mich.), polyoxyethylene sorbitan fatty acid esters (available as the TWEEN® series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON® X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization or suspension polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. An example is polymerization initiated using azo compounds such as azobisisobutyronitrile (available from Aldrich Chemical Co.). In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below with regards to suitable hydrate inhibitors.

As previously noted, the reaction mixture can optionally include a buffer. The buffer can comprise any known buffer that is compatible with the initiation system. Examples of buffers suitable for use in the present invention include, but are not limited to, carbonate, phosphate, and/or borate buffers.

As previously noted, the reaction mixture can optionally include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., in the range of from about 20 to about 80° F., or in the range of from 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

As previously discussed, the reaction mixture optionally can include at least one stabilizer, also known as a suspending agent. The suspending agent can be of the form of one or more finely divided inorganic solids and/or water-soluble polymers; such suspending agents also can be called a protective colloid. Examples of finely divided inorganic solids include, but are not limited to, talc or fumed silica (both available from Aldrich Chemical Co.). An example of a protective colloid is poly(vinyl alcohol), 87-89% hydrolyzed (available from Aldrich Chemical Co.).

In forming the reaction mixture, the at least two monomers, water, the at least one surfactant, and optionally the hydrate inhibitor, can be combined under a substantially oxygen-free atmosphere that is maintained at less than about 1,000 ppmw oxygen or less than 100 ppmw oxygen. The substantially oxygen-free atmosphere can be maintained by continuously purging the reaction vessel with an inert gas such as nitrogen and/or argon. The temperature of the system can be kept at a level in the range of from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be useful to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
|---|---|---|
| Total Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiator (molar ratio) | $1 \times 10^3:1 - 5 \times 10^6:1$ | $5 \times 10^3:1 - 2 \times 10^6:1$ |
| Monomer:Reducing Comp. (molar ratio) | $1 \times 10^3:1 - 5 \times 10^6:1$ | $1 \times 10^4:1 - 2 \times 10^6:1$ |
| Accelerator:Initiator (molar ratio) | 0.001:1-10:1 | 0.005:1-1:1 |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction achieved in the above-described reaction mixture can yield a latex composition comprising a dispersed phase of solid particles and a liquid continuous phase. The latex can be a stable colloidal dispersion comprising a dispersed phase of high molecular weight polymer particles and a continuous phase comprising water. The colloidal particles can make up in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can make up in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

The suspension polymerization reaction achieved in the above-described reaction mixture can yield a suspended polymer composition comprising a dispersed phase of solid particles and a liquid continuous phase. The suspension can be a stable colloidal dispersion comprising a dispersed phase of high molecular weight polymer particles and a continuous phase comprising water. The colloidal particles can make up in the range of from about 10 to about 60 percent by weight of the suspension, or in the range of from 40 to 50 percent by weight of the suspension. The continuous phase can comprise water, the high HLB surfactant, the hydrate inhibitor (if present), and buffer as needed. Water can be present in the range of from about 20 to about 80 percent by weight of the suspension, or in the range of from about 40 to about 60 percent by weight of the suspension. The high HLB surfactant can make up in the range of from about 0.1 to about 10 percent by weight of the suspension, or in the range of from 0.25 to 6 percent by weight of the suspension. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex or suspension in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex or suspension after polymerization to provide the desired amount of hydrate inhibitor in the continuous phase of the latex or suspension.

As mentioned above, at least two monomers can be employed when preparing the drag reducing composition of the present invention, thus resulting in a drag reducer comprising a plurality of polymer particles comprising copolymers. In one embodiment, the resulting copolymers can comprise residues of the above-mentioned methacrylate monomer in an amount in the range of from about 10 to about 99 weight percent, in the range of from about 20 to about 97 weight percent, or in the range of from 40 to 95 weight percent, based on the total weight of the copolymer. Additionally, the copolymers can comprise residues of the above-described comonomer in an amount in the range of from about 1 to about 90 weight percent, in the range of from about 3 to about 80 weight percent, or in the range of from 5 to 60 weight percent, based on the total weight of the copolymer.

In one embodiment, the copolymers of the resulting drag reducing composition can comprise at least partially saturated hydrocarbon backbones comprising a plurality of saturated carbon atoms. The hydrocarbon backbones of the copolymers can be at least 90 percent saturated, at least 95 percent saturated, at least 99 percent saturated, or substantially fully saturated. In one embodiment of the present invention, fewer than 50 percent, fewer than 45 percent, or fewer than 40 percent of the saturated carbon atoms in the hydrocarbon backbone of the copolymer have more than one pendant substituent.

Though not wishing to be bound by theory, the inventors have unexpectedly discovered that employing a methacrylate monomer with a comonomer comprising a polymerizable vinyl group having no more than one pendant substituent per vinyl carbon appears to produce a copolymer having improved rates of dissolution in hydrocarbon-containing fluids at lower temperatures. Similarly, copolymers having fewer saturated backbone carbon atoms comprising more than one pendant substituent seem to exhibit improved rates of dissolution in hydrocarbon-containing fluids at lower temperatures. Thus, in one embodiment of the present invention, the polymer particles of the drag reducing composition can have a hydrocarbon dissolution rate constant of at least 0.01 min$^{-1}$, at least 0.05 min$^{-1}$, or at least 0.1 min$^{-1}$ in a mixture of kerosene and isopropyl alcohol ("IPA") in a volume ratio of 95:5 kerosene:IPA. Hydrocarbon dissolution rate constants are determined in accordance with the procedure outlined below in the "Dissolution Rate Testing" portion of the Examples section.

In one embodiment of the present invention, the emulsion drag reducing polymer of the dispersed phase of the latex can have a weight average molecular weight ($M_w$) of at least about $1\times10^6$ g/mol, at least about $2\times10^6$ g/mol, or at least $5\times10^6$ g/mol. The colloidal particles of the emulsion drag reducing polymer can have a mean particle size of less than about 10 micrometers, less than about 1,000 nm (1 micrometer), in the range of from about 10 to about 500 nm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

In one embodiment of the present invention, the suspended drag reducing polymer of the dispersed phase of the suspension drag reducing polymer can have a weight average molecular weight ($M_w$) of at least about $1\times10^6$ g/mol, at least about $2\times10^6$ g/mol, or at least $5\times10^6$ g/mol. The colloidal particles of the suspended drag reducing polymer can have a mean particle size of less than about 1000 micrometers, less than about 500 micrometers, in the range of from about 1 to about 500 micrometers, or in the range of 10 to 400 micrometers. At least about 95 percent by weight of the colloidal particles can be larger than about 1 micrometer and smaller than about 500 micrometers. At least about 95 percent by weight of the particles can be larger than about 10 micrometers and smaller than about 400 micrometers. The continuous phase can have a pH in the range of from about 4 to about 10, or in the range of from about 6 to about 8, and contains few if any multi-valent cations.

In one embodiment of the present invention, the above-described drag reducing composition can be added to a hydrocarbon-containing fluid. The resulting treated hydrocarbon-containing fluid can then be transported through a pipeline. The hydrocarbon-containing fluid can comprise a liquid phase hydrocarbon, a non-liquid phase hydrocarbon, and/or a non-hydrocarbon fluid. In one embodiment, the hydrocarbon-containing fluid can comprise at least about 50 weight percent of a liquid phase hydrocarbon. Additionally, the hydrocarbon-containing fluid can comprise crude oil. Furthermore, the hydrocarbon-containing fluid of the present invention can have an average temperature of 25° C. or less, 22° C. or less, or 20° C. or less.

The resulting treated hydrocarbon-containing fluid can comprise a cumulative amount of the drag reducing copolymers sufficient to achieve a reduction in drag associated with the turbulent flow of the hydrocarbon-containing fluid through the pipeline. In one embodiment, the treated hydrocarbon-containing fluid can have a cumulative concentration of drag reducing copolymers in the range of from about 0.1 to about 500 ppmw, in the range of from about 0.5 to about 200 ppmw, in the range of from about 1 to about 100 ppmw, or in the range of 2 to 50 ppmw. Typically, at least 50 weight percent, at least 75 weight percent, or at least 95 weight percent of the drag reducing copolymer particles can be dissolved by the hydrocarbon-containing fluid. Additionally, the drag reducers employed in the present invention can provide significant percent drag reduction during transport of the hydrocarbon-containing fluid through a pipeline. For example, the drag reducers can provide at least about 5 percent drag reduction or at least 10 percent drag reduction.

The following examples are intended to be illustrative of the present invention in order to teach one of ordinary skill in the art to make and use the invention and are not intended to limit the scope of the invention in any way.

EXAMPLES

Drag Reducer Preparation Procedure

Each of the polymer samples employed in the following examples were prepared according to the following method. Polymerization was performed in a 300 mL jacketed reaction kettle fitted with a condenser, mechanical stirrer, thermocouple, septum ports, and nitrogen inlets/outlets. The kettle was charged with 0.230 g of sodium hydrogen phosphate, 0.230 g potassium dihydrogen phosphate, 4.47 g sodium dodecyl sulfate and purged with nitrogen for at least one hour. The kettle was then charged with 120 mL of deoxygenated Type I water. 2-Ethylhexyl methacrylate and a comonomer of interest were separately stirred with inhibitor remover (available from Aldrich Chemical Co., designed to remove the polymerization inhibitor 4-methoxy phenol) under a nitrogen atmosphere for at least one hour. After the desired time, the inhibitor remover was separated from the respective monomers by filtration under a nitrogen atmosphere. The desired amounts of the respective monomers were added to the reaction kettle using syringe techniques. Stirring was initiated at about 300 rpm and the kettle jacket was set to the desired polymerization temperature by using a circulating bath.

When ready to initiate polymerization, to the polymerization mixture in the kettle was added 1.0 mL of $FeSO_4$ solution (0.0021 g/mL). Following this, 1.0 mL of ammonium persulfate solution (0.0026 g/mL) and 1.0 mL of sodium formaldehyde sulfoxylate (SFS) solution (0.0018 g/mL) were each added over four hours. At the end of the four-hour period, to the polymerization mixture 1.0 mL of tert-butyl hydroperoxide solution (0.0075 g/mL) and 1.0 mL SFS solution (0.0018 g/mL) were each added over two hours.

The resulting drag reducer was a latex containing a copolymer of 2-ethylhexyl methacrylate and a comonomer. The samples had solids contents of about 45 percent by mass and a nominal polymer content of approximately 40 percent. The densities of the samples were approximately 1.0005 g/mL. The carrier fluid for each sample was 100% water.

Dissolution Rate Testing

The dissolution rate constants of several copolymers prepared via the above method were determined according to the following procedure. The rate at which a polymer dissolves can be determined by a vortex inhibition test in a kerosene-containing medium at various temperatures. At a constant stirring speed, the depth of the vortex is proportional to the amount of dissolved polymer in the kerosene-containing medium. The dissolution rate is a first order function:

$$d/dt\,(Conc_{undissolved}) = -k \times Conc_{undissolved}$$

wherein k is the dissolution rate constant. The time, T, for a certain fraction of the polymer to be dissolved is a function of k as follows:

$$T_{\%\,dissolved} = [ln\,100/(100-\%\,dissolved)]/k$$

Figure 2:
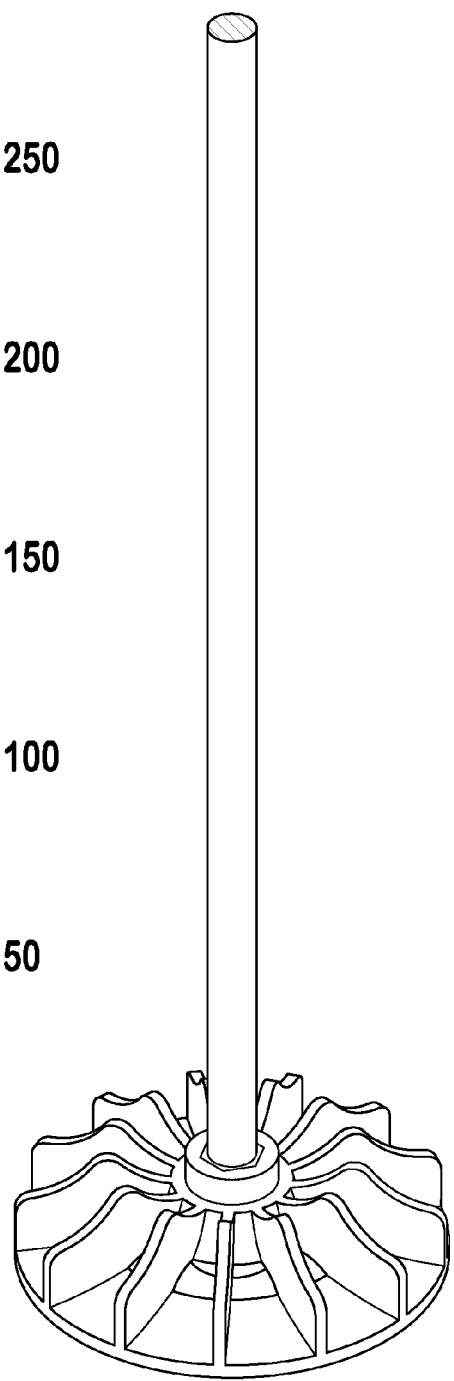
FIG. 2 is an isometric view of the stirrer employed in the dissolution rate tests.
Figure 3:
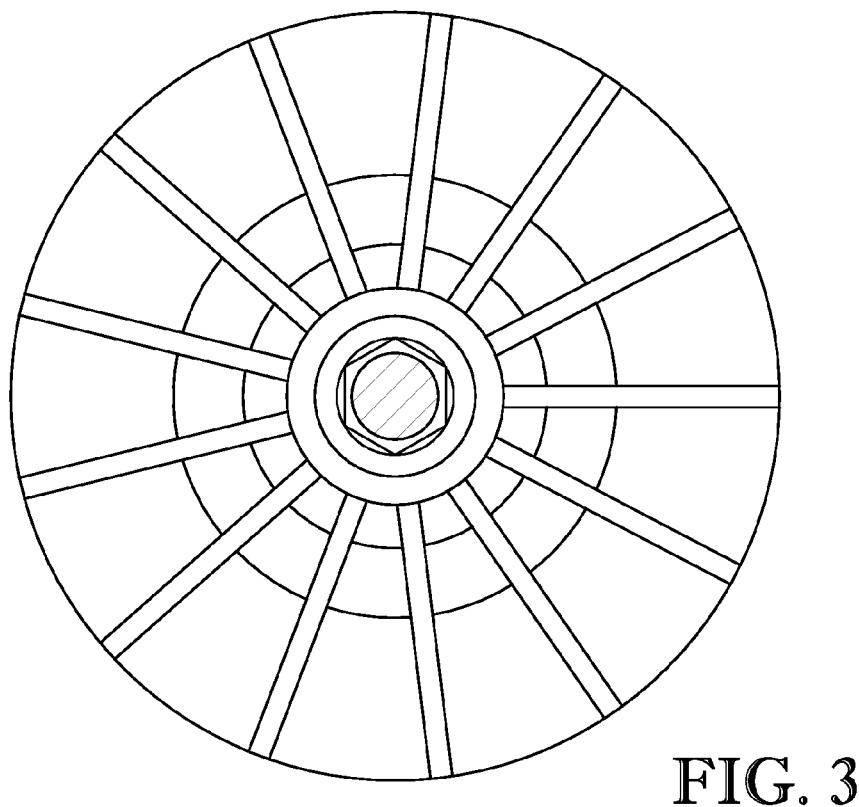
FIG. 3 is a top view of the stirrer employed in the dissolution rate tests.
Figure 4:
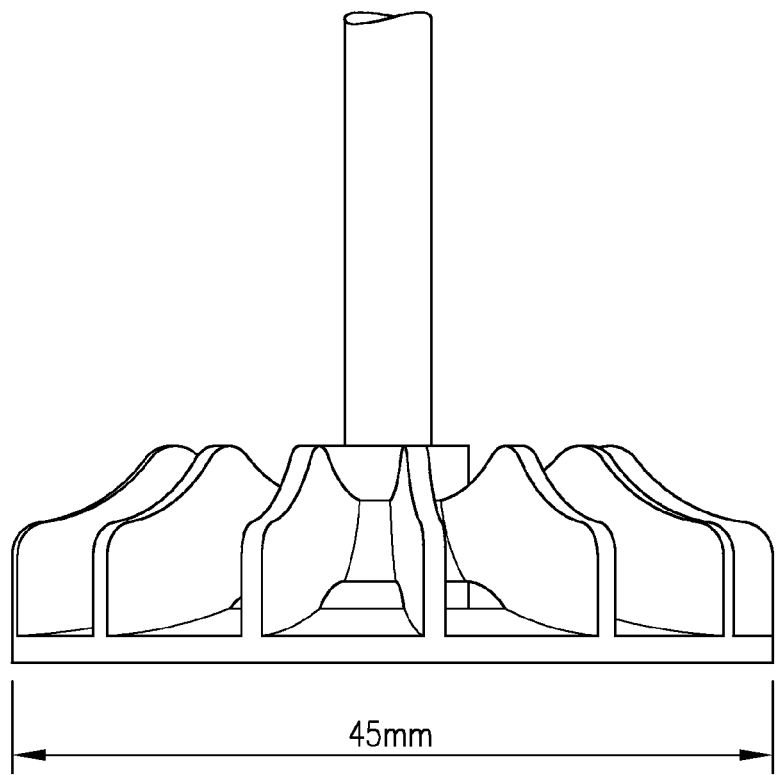
FIG. 4 is a side view of the stirrer employed in the dissolution rate tests.

FIG. 1 schematically illustrates the dissolution rate test apparatus used to determine the dissolution rate constant. The dissolution rate test apparatus included a rotating stirrer that was placed in a jacketed graduated 250 mL cylinder having an internal diameter of 48 mm. The upper end of the rotating stirrer was connected to a variable-speed motor (not shown). The specific configuration of the rotating stirrer is illustrated in detail in FIGS. 2-4. The rotating stirrer employed in the dissolution rate tests was a Black & Decker paint stirrer made from a casting of oil resistant plastic. The stirrer head was formed of a 45 mm diameter disk made up of a central disk and an outer ring. The central disk was 20 mm in diameter and 1.5 mm thick and was centered on a hub that was 12 mm in diameter and 12 mm thick. The hub was drilled in the center for attachment of the stirring head to a 4 mm diameter shaft. The shaft was threaded for 27 mm so that two small nuts held the stirring head to the shaft. The outer ring was 45 mm in diameter, 9 mm wide, and 1.5 mm thick. The outer ring was attached to the inner disk by 13 evenly spaced arcs 13 mm long and 1 mm thick. The outer ring resided 6 mm below the level of the inner disk. The arcs that attached the outer ring to the inner disk acted as paddles to stir the fluid in the test cylinder. The shaft that attached the stirring head to the stirring motor (not shown) was 300 mm long. It should be noted that dissolution rate test results may vary somewhat if different stirrer configurations are used.

To conduct the dissolution rate test, the stirrer was positioned inside the cylinder and adjusted so that the bottom of stirrer head was about 5 millimeters from the bottom of the cylinder. The cylinder jacket was then filled with water recirculated from a recirculating water bath with controlled heating and cooling capability. The desired temperature was selected and the bath was allowed to reach that temperature. With the stirrer in place, the jacketed graduated cylinder was filled to the 200 mL line with a mixture comprising 95 volume percent kerosene and 5 volume percent isopropyl alcohol ("IPA"). The circulation of cooling fluid through the graduated cylinder jacket was initiated. The kerosene mixture inside the graduated cylinder was stirred for sufficient time to allow the temperature to equilibrate at the set temperature, usually 10-15 minutes. The kerosene mixture temperature was checked with a thermometer to insure that the kerosene mixture was at the desired test temperature. The speed of the motor was adjusted to stir rapidly enough to form a vortex in the kerosene mixture that reached to the 125 mL graduation mark in the cylinder.

A 0.5 mL aliquot of the polymer latex was added to the stirring kerosene mixture with the vortex established at the 125 mL mark. The aliquot of the latex was added to the kerosene at the desired temperature, as indicated in Tables 1 and 2 below. A timer was used to monitor and record the time required for the vortex to recede to each of the 5 mL increments on the cylinder: 130, 135, 140, and so on. However, the determination was stopped when the time exceeded 30 minutes. The position of the vortex at the end of 30 minutes is designated as $V_f$.

The dissolution rate constant, k, was calculated from the slope of a plot of the log of the relative vortex against time. The relative vortex is the decimal fraction of the relationship $$[V_f - V_t]/[V_f - V_i]$$

where $V_f$ is the final reading at the maximum vortex suppression within the 30 minute timeframe of the experiment, $V_i$ is the initial vortex reading prior to addition of drag reducing polymer (which is routinely set at the 125 mL mark), and $V_t$ is the vortex reading at the specified marks 130, 135, 140, and so on up to the reading at the maximum vortex suppression. A linear regression analysis was performed on the plot of the log of the relative vortex against time. The resulting slope of the data gave the dissolution rate constant, k, for a given temperature and concentration of active polymer when multiplied by $-2.303$.

Example 1

Comonomers With One or Less Pendant Substituents Per Vinyl Carbon

Copolymer latex drag reducers prepared from 2-ethylhexyl methacrylate monomer and a variety of comonomers comprising a polymerizable vinyl group having no more than one pendant substituent per vinyl carbon were prepared according to the above-described procedure. Thereafter, the dissolution rate of each sample was tested and the dissolution rate constant was calculated as described above. The results from these procedures are listed in Table 1.

TABLE 1

Dissolution Rates of Copolymers Comprising Comonomers Having One or Less Pendant Substituents per Vinyl Carbon

| Copolymer | Monomer Ratio (molar) | Dissolution Rate Constant In 95:5 Kerosene:IPA | | |
|---|---|---|---|---|
| | | 40° C. | 30° C. | 20° C. |
| 2-ethylhexyl methacrylate/ ethylhexyl acrylate | 100:0 | N/A | 0.361 | 0.273 |
| | 84:16 | N/A | 0.714 | 0.417 |
| | 84:16 | N/A | 0.796 | 0.563 |
| | 84:16 | N/A | 0.552 | 0.344 |
| | 100:0 | N/A | No Dissolution | No Dissolution |
| | 95:5 | N/A | 0.118 | 0.017 |
| | 89:11 | N/A | 0.206 | 0.089 |
| | 79:21 | N/A | 0.533 | 0.359 |
| | 100:0 | 0.144 | 0.013 | No Dissolution |
| | 95:5 | 0.316 | 0.080 | No Dissolution |
| | 90:10 | 0.266 | 0.197 | 0.074 |
| | 84:16 | 0.472 | 0.719 | 0.248 |
| | 79:21 | 0.759 | 0.486 | 0.316 |
| 2-ethylhexyl methacrylate/ 3,5,5-trimethylhexyl acrylate | 100:0 | 0.403 | 0.110 | No Dissolution |
| | 98.5:1.5 | 0.353 | 0.128 | No Dissolution |
| | 95:5 | 0.355 | 0.230 | 0.065 |
| | 100:0 | 0.373 | 0.044 | No Dissolution |
| | 98.5:1.5 | 0.246 | 0.064 | No Dissolution |
| | 95:5 | 0.500 | 0.102 | No Dissolution |
| 2-ethylhexyl methacrylate/ n-hexyl acrylate | 100:0 | N/A | No Dissolution | No Dissolution |
| | 94:6 | N/A | 0.093 | No Dissolution |
| | 88:12 | N/A | 0.368 | 0.135 |

TABLE 1-continued

Dissolution Rates of Copolymers Comprising Comonomers Having One or Less Pendant Substituents per Vinyl Carbon

| Copolymer | Monomer Ratio (molar) | Dissolution Rate Constant In 95:5 Kerosene:IPA | | |
|---|---|---|---|---|
| | | 40° C. | 30° C. | 20° C. |
| | 77:23 | N/A | 0.508 | 0.472 |
| | 100:0 | N/A | N/A | No Dissolution |
| | 94:6 | N/A | N/A | No Dissolution |
| | 88:12 | N/A | N/A | 0.111 |
| | 76:24 | N/A | N/A | 0.540 |
| | 100:0 | No Dissolution | No Dissolution | No Dissolution |
| | 94:6 | 0.253 | 0.099 | 0.160 |
| | 88:12 | 0.390 | 0.362 | 0.166 |
| | 76:24 | 0.177 | 0.754 | 0.383 |
| | 100:0 | 0.213 | No Dissolution | No Dissolution |
| | 99.4:0.6 | 0.277 | 0.070 | No Dissolution |
| | 98:2 | No Dissolution | No Dissolution | No Dissolution |
| | 94:6 | 0.396 | 0.176 | 0.120 |
| | 94:6 | 0.507 | 0.163 | 0.058 |
| 2-ethylhexyl methacrylate/ benzyl acrylate | 100:0 | 0.482 | 0.145 | No Dissolution |
| | 99.3:0.7 | 0.350 | 0.112 | No Dissolution |
| | 97.8:2.2 | 0.582 | 0.309 | No Dissolution |
| 2-ethylhexyl methacrylate/ t-butyl acrylate | 100:0 | N/A | 0.073 | No Dissolution |
| | 93:7 | N/A | 0.141 | No Dissolution |
| | 86:14 | N/A | 0.410 | 0.227 |
| | 73:27 | N/A | 0.504 | 0.292 |
| | 100:0 | N/A | No Dissolution | No Dissolution |
| | 93:7 | N/A | 0.213 | 0.075 |
| | 86:14 | N/A | 0.256 | 0.407 |
| | 73:27 | N/A | 0.367 | 0.174 |
| | 100:0 | N/A | No Dissolution | No Dissolution |
| | 93:7 | N/A | 0.250 | 0.092 |
| | 86:14 | N/A | 0.277 | 0.114 |
| | 73:27 | N/A | 0.339 | 0.446 |
| 2-ethylhexyl methacrylate/ 2-phenylethyl acrylate | 100:0 | 0.411 | 0.120 | No Dissolution |
| | 99.4:0.6 | 0.327 | 0.126 | No Dissolution |
| | 98:2 | 0.203 | 0.088 | 0.078 |
| | 94:6 | 0.269 | 0.143 | 0.066 |
| | 94:6 | 0.238 | 0.286 | 0.036 |
| 2-ethylhexyl methacrylate/ n-butyl acrylate | 100:0 | N/A | 0.155 | 0.016 |
| | 93:7 | N/A | 0.158 | 0.089 |
| | 86:14 | N/A | 0.638 | 0.163 |
| | 72:28 | N/A | 0.997 | 0.529 |
| | 100:0 | N/A | N/A | N/A |
| | 80:20 | N/A | 0.676 | 0.554 |
| | 60:40 | N/A | 0.506 | 0.513 |
| | 40:60 | N/A | 0.534 | 0.508 |
| | 100:0 | N/A | 0.175 | 0.137 |
| | 80:20 | N/A | 0.461 | 0.554 |
| | 40:60 | N/A | 0.462 | 0.616 |
| | 20:80 | N/A | 0.420 | 0.454 |
| | 72:28 | N/A | 0.586 | 0.270 |
| | 72:28 | N/A | 0.601 | 0.274 |
| | 72:28 | N/A | 0.625 | 0.464 |
| | 73:27 | N/A | 0.500 | 0.328 |
| | 72:28 | N/A | 0.720 | 0.359 |
| | 72:28 | N/A | 0.578 | 0.491 |
| | 72:28 | N/A | 0.546 | 0.340 |
| | 73:27 | N/A | 0.439 | 0.331 |
| | 100:0 | N/A | N/A | No Dissolution |
| | 93:7 | N/A | N/A | 0.016 |
| | 85:15 | N/A | N/A | 0.182 |
| | 73:27 | N/A | N/A | 0.394 |
| | 100:0 | N/A | N/A | No Dissolution |
| | 93:7 | N/A | N/A | 0.019 |
| | 85:15 | N/A | N/A | 0.202 |
| | 72:28 | N/A | N/A | 0.539 |
| | 100:0 | N/A | N/A | No Dissolution |
| | 93:7 | N/A | N/A | No Dissolution |
| | 86:14 | N/A | N/A | 0.210 |
| | 72:28 | N/A | N/A | 0.453 |
| | 100:0 | 0.182 | No Dissolution | No Dissolution |
| | 98:2 | 0.585 | 0.220 | No Dissolution |
| | 93:7 | 0.546 | 0.183 | 0.073 |

TABLE 1-continued

Dissolution Rates of Copolymers Comprising Comonomers Having One or Less Pendant Substituents per Vinyl Carbon

| Copolymer | Monomer Ratio (molar) | Dissolution Rate Constant In 95:5 Kerosene:IPA | | |
|---|---|---|---|---|
| | | 40° C. | 30° C. | 20° C. |
| 2-ethylhexyl methacrylate/ isodecyl acrylate | 100:0 | 0.287 | 0.085 | No Dissolution |
| | 99.5:0.5 | 0.421 | 0.094 | No Dissolution |
| | 98.6:1.4 | 0.526 | 0.068 | No Dissolution |
| | 96:4 | 0.259 | 0.121 | No Dissolution |
| | 96:4 | 0.232 | 0.135 | No Dissolution |
| 2-ethylhexyl methacrylate/ isobutyl acrylate | 100:0 | N/A | 0.019 | No Dissolution |
| | 93:7 | N/A | 0.143 | 0.065 |
| | 85:15 | N/A | 0.190 | 0.106 |
| | 72:28 | N/A | 0.414 | 0.335 |
| | 100:0 | 0.077 | No Dissolution | No Dissolution |
| | 93:7 | 0.162 | 0.082 | 0.017 |
| | 85:15 | 0.567 | 0.408 | 0.251 |
| | 72:28 | 1.000 | 0.838 | 0.614 |
| 2-ethylhexyl methacrylate/ isobornyl acrylate | 100:0 | 0.070 | No Dissolution | No Dissolution |
| | 99.5:0.5 | 0.082 | No Dissolution | No Dissolution |
| | 98.4:1.6 | 0.193 | 0.016 | No Dissolution |
| | 95:5 | 0.315 | 0.205 | 0.082 |
| | 95:5 | 0.175 | 0.022 | No Dissolution |
| 2-ethylhexyl methacrylate/ sec-butyl acrylate | 100:0 | 0.024 | 0.023 | No Dissolution |
| | 99.2:0.8 | 0.016 | No Dissolution | No Dissolution |
| | 98:2 | 0.028 | No Dissolution | No Dissolution |
| | 93:7 | 0.256 | 0.099 | 0.094 |
| | 93:7 | 0.224 | 0.106 | No Dissolution |
| 2-ethylhexyl methacrylate/ethyl acrylate | 100:0 | 0.032 | No Dissolution | No Dissolution |
| | 99:1 | 0.278 | 0.085 | No Dissolution |
| | 98:2 | 0.072 | No Dissolution | No Dissolution |
| | 90:10 | 0.436 | 0.331 | 0.086 |
| | 90:10 | 0.379 | 0.155 | 0.016 |
| 2-ethylhexyl methacrylate/ styrene | 100:0 | 0.101 | No Dissolution | No Dissolution |
| | 99:1 | 0.281 | 0.077 | No Dissolution |
| | 97:3 | 0.190 | No Dissolution | No Dissolution |
| 2-ethylhexyl methacrylate/ bis(2-ethylhexyl) maleate | 100:0 | 0.194 | 0.013 | No Dissolution |
| | 99.7:0.3 | 0.081 | No Dissolution | No Dissolution |
| | 99:1 | 0.341 | 0.016 | No Dissolution |
| | 97:3 | No Dissolution | No Dissolution | No Dissolution |
| | 97:3 | No Dissolution | No Dissolution | No Dissolution |
| 2-ethylhexyl methacrylate/ bis(2-ethylhexyl) fumarate | 100:0 | No Dissolution | No Dissolution | No Dissolution |
| | 99.7:0.3 | 0.227 | 0.010 | No Dissolution |
| | 99:1 | 0.155 | 0.013 | No Dissolution |
| | 97:3 | 0.189 | No Dissolution | No Dissolution |
| | 97:3 | 0.075 | No Dissolution | No Dissolution |

In addition to the above, one sample drag reducer comprising an 80:20 molar ratio blend of 2-ethylhexyl methacrylate to n-butyl acrylate was tested at 10° C. This sample yielded a dissolution rate constant of 0.191.

Example 2

Comonomers With More Than One Pendant Substituent On a Vinyl Carbon

Copolymer latex drag reducers prepared from 2-ethylhexyl methacrylate monomer and a variety of comonomers comprising a polymerizable vinyl group with at least one vinyl carbon having more than one pendant substituent were prepared according to the above-described procedure. Thereafter, the dissolution rate of each sample was tested and the dissolution rate constant was calculated as described above. The results from these procedures are listed in Table 2.

TABLE 2

Dissolution Rates of Copolymers Comprising Comonomers Having More Than One Pendant Substituent on a Vinyl Carbon

| Copolymer | Monomer Ratio (molar) | Dissolution Rate Constant In 95:5 Kerosene:IPA | | |
|---|---|---|---|---|
| | | 40° C. | 30° C. | 20° C. |
| 2-ethylhexyl methacrylate/ lauryl methacrylate | 100:0 | No Dissolution | No Dissolution | No Dissolution |
| | 96:4 | No Dissolution | No Dissolution | No Dissolution |
| 2-ethylhexyl methacrylate/ n-octyl methacrylate | 100:0 | 0.051 | No Dissolution | No Dissolution |
| | 98.5:1.5 | 0.245 | No Dissolution | No Dissolution |
| 2-ethylhexyl methacrylate/ benzyl methacrylate | 100:0 | No Dissolution | No Dissolution | No Dissolution |
| | 94:6 | No Dissolution | No Dissolution | No Dissolution |
| 2-ethylhexyl methacrylate/ t-butyl methacrylate | 100:0 | 0.028 | No Dissolution | No Dissolution |
| | 93:7 | No Dissolution | No Dissolution | No Dissolution |
| 2-ethylhexyl methacrylate/ 2-phenylethyl methacrylate | 100:0 | 0.216 | No Dissolution | No Dissolution |
| | 96:4 | 0.035 | 0.017 | No Dissolution |
| 2-ethylhexyl methacrylate/ n-butyl methacrylate | 100:0 | N/A | 0.214 | 0.155 |
| | 80:20 | N/A | 0.053 | No Dissolution |
| | 40:60 | N/A | No Dissolution | No Dissolution |
| | 100:0 | 0.110 | No Dissolution | No Dissolution |
| | 98:2 | 0.117 | No Dissolution | No Dissolution |
| | 93:7 | 0.251 | No Dissolution | No Dissolution |
| 2-ethylhexyl methacrylate/ cyclohexyl methacrylate | 100:0 | 0.329 | 0.055 | 0.014 |
| | 98:2 | 0.089 | 0.013 | No Dissolution |
| | 94:6 | 0.146 | 0.011 | No Dissolution |
| 2-ethylhexyl methacrylate/ isodecyl methacrylate | 100:0 | No Dissolution | No Dissolution | No Dissolution |
| | 98.7:1.3 | No Dissolution | No Dissolution | No Dissolution |
| 2-ethylhexyl methacrylate/ isobutyl methacrylate | 100:0 | No Dissolution | No Dissolution | No Dissolution |
| | 93.5:6.5 | No Dissolution | No Dissolution | No Dissolution |
| 2-ethylhexyl methacrylate/ hexadecyl methacrylate | 100:0 | 0.186 | 0.020 | No Dissolution |
| | 99.7:0.3 | 0.389 | 0.098 | No Dissolution |
| | 97:3 | 0.025 | No Dissolution | No Dissolution |
| 2-ethylhexyl methacrylate/ isobornyl methacrylate | 100:0 | 0.140 | No Dissolution | No Dissolution |
| | 99.5:0.5 | 0.393 | 0.072 | No Dissolution |
| | 95:5 | 0.334 | 0.112 | No Dissolution |
| 2-ethylhexyl methacrylate/ tridecyl methacrylate | 100:0 | 0.417 | 0.118 | No Dissolution |
| | 99.6:0.4 | 0.047 | No Dissolution | No Dissolution |
| | 99:1 | No Dissolution | No Dissolution | No Dissolution |
| | 96:4 | No Dissolution | No Dissolution | No Dissolution |
| | 96:4 | No Dissolution | No Dissolution | No Dissolution |
| 2-ethylhexyl methacrylate/ dibutyl itaconate | 100:0 | 0.022 | No Dissolution | No Dissolution |
| | 99.5:0.5 | 0.026 | No Dissolution | No Dissolution |
| | 98.7:1.3 | 0.456 | 0.085 | No Dissolution |
| | 96:4 | 0.101 | 0.012 | No Dissolution |
| | 95:5 | 0.354 | 0.120 | 0.085 |

As can be seen by comparing Tables 1 and 2, preparing a copolymer from a 2-ethylhexyl methacrylate monomer and a comonomer comprising a polymerizable vinyl group having no more than one pendant substituent per vinyl carbon produces a drag reducer having better dissolution rate constants at lower temperatures than when a comonomer having more than one substituent on a vinyl carbon is employed. For example, only one of the copolymers containing a comonomer having more than one substituent on a vinyl carbon (i.e., dibutyl itaconate) prepared in Example 2 was able to be dissolved according to the above-described procedure at a temperature of 20° C.[1] By comparison, of the 15 copolymer samples tested containing a comonomer having no more than one pendant substituent per vinyl carbon, 10 were able to be dissolved at 20° C. in at least one of the sample ratios prepared. Additionally, at least one sample prepared employing a comonomer having no more than one pendant substituent per vinyl carbon (i.e., n-butyl acrylate) was able to be dissolved at 10° C. Accordingly, comonomers comprising a polymerizable vinyl group having no more than one pendant substituent per vinyl carbon appear to produce drag reducing copolymers having improved dissolution rate constants at lower temperatures over comonomers having more than one pendant substituent on a vinyl carbon. This is even more evident by comparing polymers that differ only with respect to the presence or absence of the second pendant group. As an example, the dissolution rate constant, k, for 80:20 EHMA/n-butyl acrylate is about 0.5 min$^{-1}$ at 20° C. and dissolves much more rapidly compared to the control EHMA homopolymer while the corresponding EHMA/n-butyl methacrylate polymer does not even dissolve at 20° C. under the test conditions.

[1] Note that the entries for n-butyl methacrylate and cyclohexyl methacrylate comonomers do indicate some dissolution at 20° C.; however, no comonomer was present in the samples exhibiting dissolution (i.e., the monomer-to-comonomer ration was 100:0).

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Claims Not Limited to the Discloses Embodiments

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A mixture comprising a drag reducing composition and a hydrocarbon-containing fluid comprising: a continuous phase and a plurality of drag reducing polymer particles, wherein at least a portion of said polymer particles comprise copolymers containing from about 40 wt % to about 95 wt % of at least one methacrylate monomer and at least from about 5 wt % to about 60 wt % of one comonomer, wherein said comonomer comprises a polymerizable vinyl group having no more than one pendant substituent per vinyl carbon, and a hydrocarbon-containing fluid, wherein said drag reducing composition reduces the pressure drop associated with the turbulent flow of a said hydrocarbon containing fluid through a conduit and wherein said hydrocarbon containing fluid has an average temperature of 25° C. or less.

2. The composition of claim 1, wherein said copolymers comprise saturated hydrocarbon backbones comprising a plurality of carbon atoms, wherein fewer than 50 percent of said carbon atoms have more than one pendant substituent.

3. The composition of claim 1, wherein said copolymers comprise saturated hydrocarbon backbones comprising a plurality of carbon atoms, wherein fewer than 45 percent of said carbon atoms have more than one pendant substituent.

4. The composition of claim 1, wherein said methacrylate monomer has the following structure:

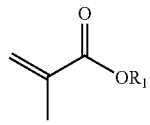

wherein $R_1$ is a $C_1$ to $C_{20}$ alkyl, isoalkyl, cycloalkyl, aryl, or aryl-substituted alkyl.

5. The composition of claim 1, wherein said methacrylate monomer comprises $C_4$-$C_{20}$ alkyl, $C_6$-$C_{20}$ substituted or unsubstituted aryl, or aryl-substituted $C_1$-$C_{10}$ alkyl esters of methacrylic acid.

6. The composition of claim 1, wherein said methacrylate monomer comprises 2-ethylhexyl methacrylate.

7. The composition of claim 1, wherein said comonomer is selected from the group consisting of n-butyl acrylate; 2-ethylhexyl acrylate; 3,5,5-trimethylhexyl acrylate; tert-butyl acrylate; 2-phenylethyl acrylate; iso-butyl acrylate; isobornyl acrylate; n-hexyl acrylate; sec-butyl acrylate; ethyl acrylate; and lauryl acrylate.

8. The composition of claim 1, wherein said comonomer comprises n-butyl acrylate.

9. The composition of claim 1, wherein said copolymers comprise said comonomer in an amount in the range of from about 1 to about 90 weight percent based on the total weight of the copolymer.

10. The composition of claim 1, wherein said copolymers said comonomer in an amount in the range of from about 3 to about 80 weight percent based on the total weight of the copolymer.

11. The composition of claim 1, wherein said copolymers comprise said methacrylate monomer in an amount in the range of from about 10 to about 99 weight percent based on the total weight of the copolymer.

12. The composition of claim 1, wherein said polymer particles have a hydrocarbon dissolution rate constant of at least about 0.01 min$^{-1}$ at 20° C. in a mixture of kerosene and isopropyl alcohol ("IPA") in a volume ratio of 95:5 kerosene:IPA.

13. The composition of claim 1, wherein said continuous phase comprises water, one or more alcohols, and/or one or more polyols.

14. The composition of claim 1, wherein said drag reducing composition comprises said polymer particles in an amount in the range of from about 10 to about 60 weight percent based on the total weight of said drag reducing composition.

15. The composition of claim 1, wherein said polymer particles have a weight average molecular weight of at least $1 \times 10^6$ g/mol.

16. The composition of claim 1, wherein said drag reducing composition comprises an emulsion drag reducing polymer wherein said polymer particles have an average particle size in the range of from about 10 to about 500 nm.

17. The composition of claim 1, wherein said drag reducing composition comprises a suspension drag reducing polymer wherein said polymer particles have an average particle size in the range of from about 1 to about 500 micrometers.

* * * * *